Sept. 4, 1951 J. L. BILDERBECK 2,566,512
TAKE-UP REELING MECHANISM FOR ELECTRICALLY
OPERATED LAWN MOWERS
Filed May 19, 1949 2 Sheets-Sheet 1
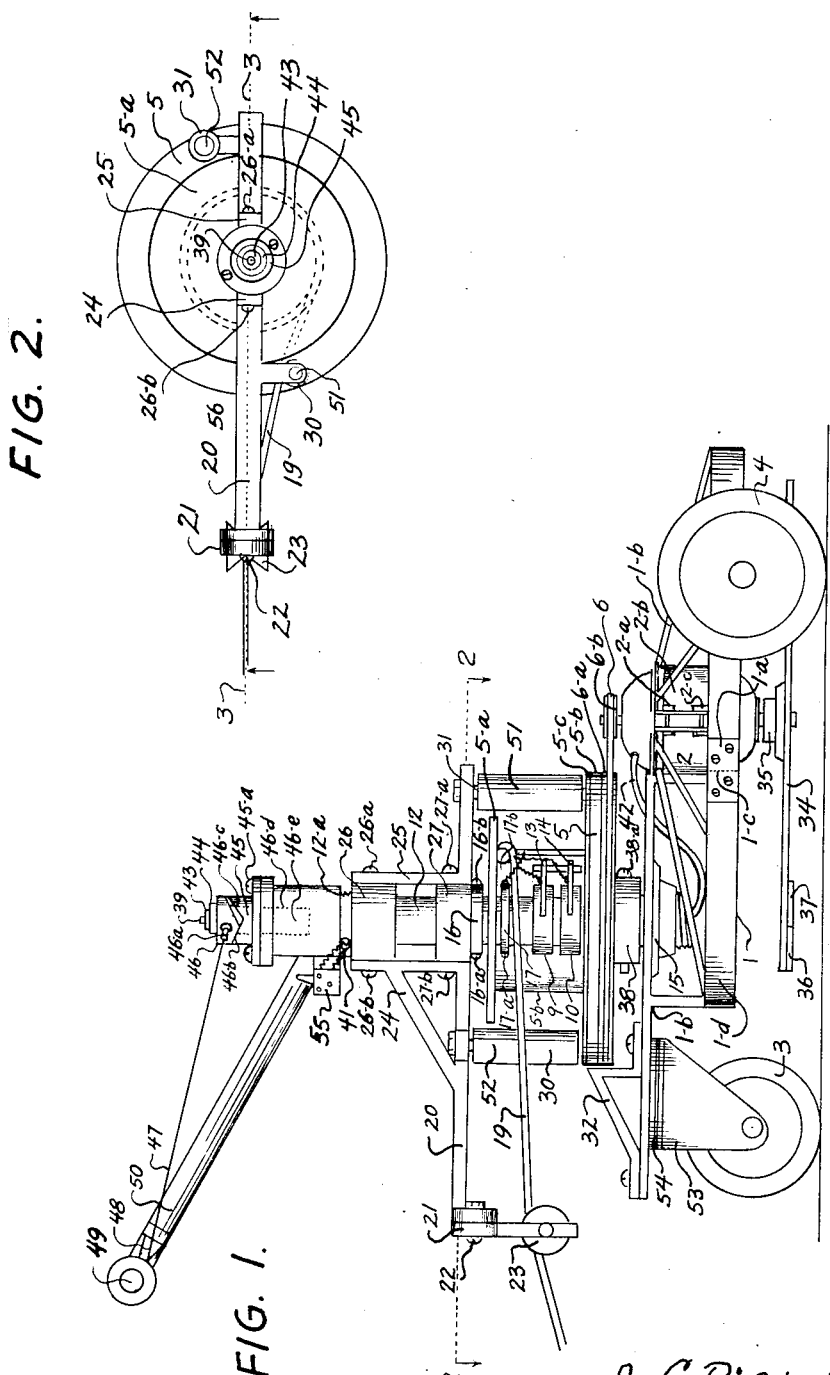
J. L. Bilderbeck
INVENTOR

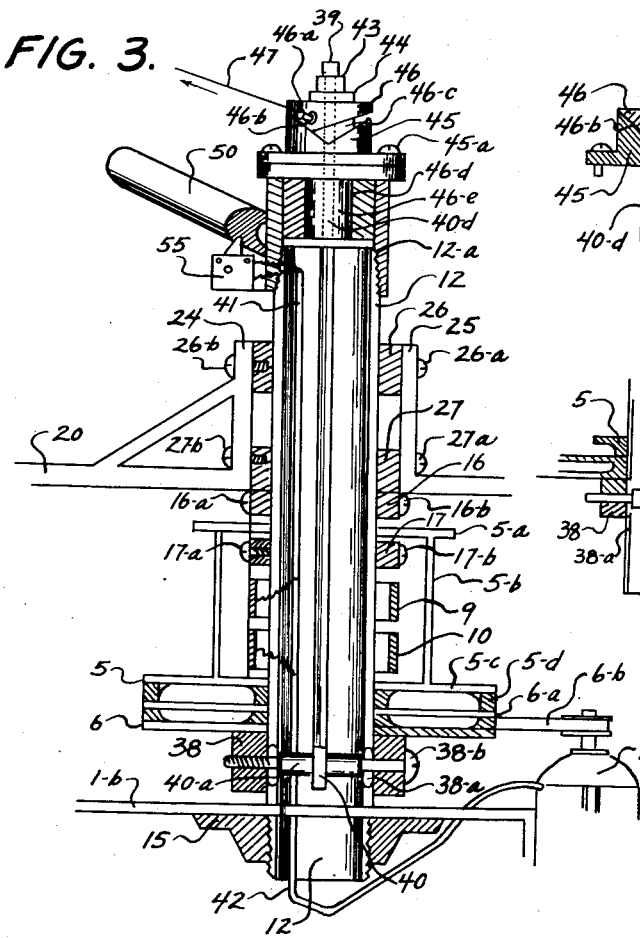

Patented Sept. 4, 1951

2,566,512

UNITED STATES PATENT OFFICE 2,566,512

TAKE-UP REELING MECHANISM FOR ELECTRICALLY OPERATED LAWN MOWERS

James L. Bilderbeck, Jacksonville, Fla.

Application May 19, 1949, Serial No. 94,135

5 Claims. (Cl. 242—91)

My invention relates to electric machines with more specific reference to improvements in electric lawn mowers.

One object of my invention is to provide novel means of controlling the electric motor cord carrying the current, by controlling the tension in cord between the motor and the plug-in source of current.

Another purpose of my invention is to provide a main shaft bearing a handle bar at the top thereof with a reel and clutch wheel at the bottom of and rotatable around the same shaft so as to enable the operator of the machine to step over the above-mentioned cord while turning completely around in any direction during operation, the means provided being functional because the means used to guide and control the machine are sufficiently remote in position as to be out of the way of means used to handle the cord.

I furthermore provide a cord guide having a long arm rotatable completely around the aforesaid main shaft so as to extend at all times in the direction of the plug-in source of electricity, the cord carrying the electricity during operation being reeled in or reeled out through a cord guide pulley so arranged as to require the minimum tension in the said cord to produce the aforesaid results.

I furthermore provide a clutch lifter assembly, operative to lift a clutch wheel the latter rotatable around said main shaft by means cooperative through and within said main shaft, said clutch wheel being thereby suspended from the aforesaid handle bar so that the weight of the reel, while being effective in producing clutch action, is also effective in releasing the clutch wheel from the reel during operation.

Of the drawings,

Fig. 1 represents a general plan view of my invention in relief in a horizontal position.

Fig. 2 represents a partial top view of the machine showing the cord guide 24 and cooperative parts thereto related taken on the line 2—2 of Fig. 1.

Fig. 3 represents an upright longitudinal midsection view of the main shaft 12 on an enlarged scale and its surrounding parts so as to show the controls of the machine more plainly in relief. The view is taken on line 3—3 of Figure 2.

Fig. 4 is a top view of rotary cutter 34 with reference to its normal position represented in Fig. 1 as operative in a horizontal plane.

Fig. 5 represents an upright longitudinal midsection view of the main shaft, as in Fig. 3, but the former drawing shows details of clutch lifter 46 shown also in mid-section.

Referring more in detail to the drawings, numeral 1 designates the frame, riding in a horizontal position on wheels as 3 and 4. Ring portion 1d is a metal bar bent in the shape of a ring, the ends of which meeting at 1c are screwed each to each on piece 1a. The frame extension 1b, carrying a hollow main shaft 12, the latter being threaded to the former and vertically arranged thereon is welded to a wide collar 2b, the latter collar being clamped with screws 2a and 2c so as to encase and adjustably hold motor 2 in a vertical position. Struts as 1e extending upward and radially inward from ring portion 1d to collar 2b are used to connect the former to latter so that piece 1a and the screws 2a and 2c, being located between the same two struts, permit the frame to spring apart when the screws are loosened during adjustment of the motor.

Figure 1 shows the rotary cutter 34, having hub 35 by which it is fastened to the motor and cutter blades 36 and 37.

Referring to Fig. 1, 9 and 10 are rings respectively connected in series with switch 55 and with the motor through electrical cord 41 and through the brushes 13 and 14 to the plug in source through the reel cord 19.

Fig. 1 and Fig. 2 show a cord guide and cord retainer assembly comprising parts represented by numerals 20, 21, 22, 23, 24, 25, 26, 27, 30, 31, 51, and 52, seated on ring 16, the latter being held stationary on the main shaft by set screws shown as 16a and 16b. The long arm 20 of the assembly carries a screw 22, the latter serving as an axis on which shorter arm 23 is rotatable in a plane perpendicular to arm 20, pulley 23 carrying the cord 19. Roller 30 and 31 are rotatable on rods 52 and 51 respectively, the rods in turn secured to arms 20 and 25 respectively. The entire assembly is rotatable on the aforesaid ring and main shaft so that the main arm 20 is always extended in the direction of electrical plug-in of cord 19 during operation. In other words, when the lawn mower supporting the main shaft is turned horizontally in any direction, the assembly is held in alignment with the electrical cord extending toward the electrical plug-in source by a force which is a component of the tension in the cord as governed momentarily by angle of turning of the mower.

It is evident from Fig. 1 that when motor 2 is turning in a counterclockwise direction with reference to the eye of an operator above the machine, tension will be produced in cord 19 tending to wind it on the reel.

When the lawn mower is turned abruptly, the direction of the above-mentioned tension will change so as to affect first of all a swing of arm 21 followed by a swing in the entire assembly of which it is a component part, the short arm having its inertia overcome first. The swinging of arm 21 prevents binding of cord 19 against pulley 23 or the sides of the short arm and by changing the direction of axis of the pulley lessens the pull necessary to maintain the above-mentioned alignment.

It will be noted in Fig. 3 that 30 and 31 freely rotatable act as retainer rollers for the cord on the reel.

It will be noted that motor 2 is encased in a wide metal band 2b, held together by bolts 2a and 2c, 1b being a frame extension welded to band 2b and frame 1 and struts as 1b extending radially outward also welded to the band and to the frame. Frame 1 is cut across at 1c and piece 1a is screwed to the cut end. The aforesaid construction permits easy adjustment of the motor with respect to the frame, the band and frame being easily sprung apart when unscrewed. Slightly above frame extension 1b and surrounding main shaft 12 is suspension ring 38, annular in shape with suspension screw 38b extending diametrically and centrally across it as shown in Figure 3. The screw extends through slots as 38a, the latter being diametrically opposed in the main shaft wall so as to permit the suspension ring to be adjustable to move up and down therein without resting thereon. A long rod 39—40 is welded to a spacer tube 40a, the latter carrying screw 38b.

At the top of the main shaft, and threaded to it at 12a, is an enlarged portion of handle bar 50 so located as to support the other controls mechanical and electrical apart from and out of the way of other moving parts. Thus, in Fig. 3, 55 is the switch, connecting cord 41—42 to electric motor 2 and connecting rings 9 and 10 through brushes 13 and 14, and through cord 19 to the plug-in source of electricity. All of the electrical connections as mentioned are arranged in electrical series.

At the top of rod 39—40 is a disk 44 and lock nut 43, together adjustable on threads of rod 39—40 so as to determine the distance between the disk and the slot 38a and so as to be locked in the position so determined.

45 is a round cam element held stationary on handle bar 50 by screws as 45a, the upper surface of the aforesaid cam element being made of two inclined planes as 46b intersecting on and symmetrical with respect to a diameter of the same. Numeral 46 designates a lifting cam seated on the stationary cam element, the former having lower surfaces similar to and coincident with the upper surface of the latter. 46c and 46e designate a round stem portion of the lifting cam having an outer cylindrical surface 46d rotatable on a similar inner cylindrical surface of the stationary cam element, the surfaces being concentric with rod 39, 40. 46d is a hole in the lifter cam, the hole being larger than the rod which it surrounds. See Fig. 5.

46a is a knob attached to the lifter cam, the former being connected to hand lever 48 at handle 49 by wire 47. Now when the knob 46a is pulled in the direction of the arrow (see Fig. 3) the lifter cam riding on incline 46b and cylindrical surface 46d is lifted upward carrying the rod 39—40, screw 38b and "suspension ring" 38. 6 is a clutch wheel concentrically mounted and rotatable around the main shaft 12 and seated on suspension ring 38. 6b is the belt connecting the clutch wheel to the motor and 6a a surface of the clutch wheel connecting the latter with rubber clutch ring 5d component with and concentrically surrounding reel 5. The reel is composed of an upper rim 5a, a drum 5b and a base 5c and is arranged rotatable in the same manner as the clutch wheel. It will now be noted that, when knob 46a is moved in the direction of the arrow that the weight of the reel now seated on the clutch wheel, will affect rotation of the former during operation of the motor so that cord 19 will be automatically wound on or wound off the reel regardless of the direction in which the lawn mower is pushed during operation.

Moreover, it is evident that during the automatic action as mentioned, both the reel and clutch are suspended from the lifting cam. But, in order to avoid excessive wear on the clutch rubber, the lifting cam may be released, whereupon the reel will descend and be seated on seating ring 17; the clutch wheel descending still farther is thereby released from the reel. Ring 17 is rigidly held by set screws 17a and 17b. It is furthermore evident the weight of the reel is used as the clutching force as well as the force tending to release the clutch wheel. The reel is seated on seating ring 17 when the knob is released from its pull in the direction of the arrow.

Immediately above reel 5 is the cord guide assembly 24 seated on annulus 16 in a fixed position above said reel so as to be rotatable on main shaft 12 with reference to said reel. The long arm 20 of the cord guide and the arm 25 are each screwed to rings 26 and 27, each of the latter having bearing surfaces so as to be rotatable on main shaft 12. Swinging arm 21 is attached to the long arm 20 by screw 22 so as to permit free swinging of arm 21, pulley 23 attached to the lower end of arm 21 carrying cord 19 to and from the reel. 51 and 52 are roller cord retainers held to arms 25 and 26 respectively by rods 51 and 52. Long arm 20 having increased leverage is easily aligned in the direction of electrical plug-in during abrupt turns of the machine in operation, it being evident that the pulley swinging in the direction of the turn, prevents the tendency of the cord to bind against the side of the pulley.

It will be evident from Figure 1 and the description that rotary cutter 34 and clutch wheel 6 turn when motor 2 turns.

Figure 3 shows how said clutch wheel is adjustably suspended by suspension ring 38 from cam element 46.

When knob 46a is pulled in the direction of the arrow as shown in Figure 3, said clutch wheel is drawn upward against the bottom of reel 5. The latter is thus given sufficient torque to produce the desired tension in cord 19 carried by said reel. When knob 46a is secured at a desired tension cord 19 is taken in or reeled out automatically.

Since cord-guide arm 20 always extends in the direction of plug-in source of electricity the lawn mower in operation really turns on said cord guide.

Having described my machine, what I claim as new is:

1. In a machine of the kind described the combination comprising a frame, a motor clamped on said frame, a main shaft supported in a vertical position on said frame, a handle bar attached to the top of said main shaft, a power cord connected to said motor, a reel carrying said power cord, said reel being rotatably mounted on and around said main shaft under said handle bar, a clutch connected to said reel and means by which said clutch is driven and regulated so as to produce desirable tension in said power cord as it is reeled in or reeled out during operation; said frame comprising an outer ring portion being connected to an inner band by welded struts; said ring portion and said inner band each being a clamping device for vertical adjustment of said motor.

2. In a machine of the kind described the combination comprising a frame, a motor clamped on said frame, a cutter blade attached to said motor, a main shaft supported in a vertical position on said frame, a handle bar attached to the top of said main shaft, a power cord connected to said motor through said main shaft, a reel carrying said power cord, said reel being rotatably mounted axially on said shaft under said handle bar, a clutch connected to said reel and means by which said clutch is driven and regulated so as to produce desirable tension in said power cord as it is reeled in or reeled out during operation; a cord guide comprising a long arm completely rotatable around said reel in a horizontal plane on said main shaft so as to guide said power cord into said reel, a guide being provided in said cord guide to carry said power cord into and out of said reel.

3. The combination as claimed in claim 2 including said cord guide, said reel, and said clutch all cooperatively mounted on said main shaft, the latter being a common axis providing complete rotatability for each of the former during co-operation.

4. The combination as claimed in claim 2 including said main shaft, the latter having diametrically opposed slots vertically elongated through the wall thereof and means within said main shaft by which said clutch is controlled by way of said slots.

5. The combination as claimed in claim 2 specifically including said reel mounted on said main shaft as an axis said main shaft supported handle being above said reel so as to permit said power cord to enter said reel unobstructedly from any direction in a horizontal plane.

J. L. BILDERBECK.

REFERENCES CITED

The following references are of record in the file of this patent:

UNITED STATES PATENTS

| Number | Name | Date |
|---|---|---|
| 1,490,127 | Peters | Apr. 15, 1924 |
| 1,567,055 | Huff | Dec. 29, 1925 |
| 1,569,987 | Lamberti | Jan. 19, 1926 |
| 1,831,681 | Miller | Nov. 10, 1931 |
| 2,295,072 | Blessing | Sept. 8, 1942 |
| 2,474,566 | Applegate | June 28, 1949 |